US010193889B2

(12) United States Patent
Kamble (10) Patent No.: US 10,193,889 B2
(45) Date of Patent: Jan. 29, 2019

(54) DATA SOCKET DESCRIPTOR ATTRIBUTES FOR APPLICATION DISCOVERY IN DATA CENTERS

(71) Applicant: Avocado Systems Inc., San Jose, CA (US)

(72) Inventor: Keshav Govind Kamble, San Jose, CA (US)

(73) Assignee: Avocado Systems Inc., San Jose, CA (US)

( * ) Notice: Subject to any disclaimer, the term of this patent is extended or adjusted under 35 U.S.C. 154(b) by 96 days.

(21) Appl. No.: 15/182,544

(22) Filed: Jun. 14, 2016

(65) Prior Publication Data

US 2016/0366142 A1 Dec. 15, 2016

Related U.S. Application Data

(60) Provisional application No. 62/175,333, filed on Jun. 14, 2015.

(51) Int. Cl.
| | |
|---|---|
| *H04L 29/06* | (2006.01) |
| *G06F 17/30* | (2006.01) |
| *G06F 21/57* | (2013.01) |

(52) U.S. Cl.
CPC ........ *H04L 63/101* (2013.01); *G06F 17/3033* (2013.01); *G06F 21/57* (2013.01); *H04L 63/20* (2013.01)

(58) Field of Classification Search
CPC .............................. H04L 63/101; G06F 21/57
USPC ........................................................... 726/1
See application file for complete search history.

(56) References Cited

U.S. PATENT DOCUMENTS

| | | | |
|---|---|---|---|
| 6,694,434 B1 | 2/2004 | McGee et al. |
| 7,788,480 B2 | 8/2010 | Winget et al. |
| 7,895,642 B1 | 2/2011 | Larson et al. |
| 8,776,168 B1 | 7/2014 | Gibson et al. |
| 9,077,617 B1 | 7/2015 | Seth et al. |
| 9,094,407 B1 | 7/2015 | Matthieu et al. |
| 9,338,181 B1 | 5/2016 | Burns et al. |

(Continued)

OTHER PUBLICATIONS

Supplemental Notice of Allowance from U.S. Appl. No. 15/181,275, dated Sep. 6, 2018.

(Continued)

*Primary Examiner* — Lynn D Feild
*Assistant Examiner* — Dereena T Cattungal
(74) *Attorney, Agent, or Firm* — Zilka-Kotab, P.C.

(57) ABSTRACT

In one embodiment, a system includes a processing circuit and logic integrated with and/or executable by the processing circuit. The logic is configured to cause the processing circuit to collect all data socket descriptor databases from individual servers operating in a data center, each data socket descriptor database storing attributes of a base socket and one or more data socket descriptors used by an application or application instance operating on an individual server. The logic is also configured to cause the processing circuit to store data from the data socket descriptor databases for all applications and application instances operating in the data center in a central data socket descriptor database, the central data socket descriptor database being configured to store attributes of all data socket descriptors used by all applications or application instances operating in the data center.

14 Claims, 8 Drawing Sheets

(56) References Cited

U.S. PATENT DOCUMENTS

| | | | |
|---|---|---|---|
| 9,349,015 B1* | 5/2016 | Archer | G06F 21/60 |
| 9,491,107 B1 | 11/2016 | Scudder et al. | |
| 9,652,618 B1 | 5/2017 | Lerner | |
| 9,742,768 B2 | 8/2017 | Cholas et al. | |
| 9,952,790 B2 | 4/2018 | Kamble | |
| 9,954,578 B2 | 4/2018 | Ehrensvard | |
| 10,129,220 B2 | 11/2018 | Kamble | |
| 2003/0118185 A1 | 6/2003 | Lambert | |
| 2003/0140089 A1 | 7/2003 | Hines et al. | |
| 2004/0034767 A1 | 2/2004 | Robinson et al. | |
| 2006/0020814 A1 | 1/2006 | Lieblich et al. | |
| 2006/0069912 A1 | 3/2006 | Zheng et al. | |
| 2007/0028090 A1 | 2/2007 | Lopez et al. | |
| 2007/0033642 A1 | 2/2007 | Ganesan et al. | |
| 2007/0129015 A1 | 6/2007 | Iwamoto et al. | |
| 2007/0239761 A1 | 10/2007 | Baio et al. | |
| 2007/0250923 A1 | 10/2007 | M'Raihi | |
| 2008/0115203 A1 | 5/2008 | Elzur | |
| 2009/0019535 A1 | 1/2009 | Mishra et al. | |
| 2009/0172402 A1 | 7/2009 | Tran | |
| 2009/0185687 A1 | 7/2009 | Wankmueller et al. | |
| 2009/0228970 A1 | 9/2009 | Morimoto | |
| 2009/0328194 A1* | 12/2009 | Kim | H04L 63/0272 726/15 |
| 2010/0037295 A1 | 2/2010 | Oh et al. | |
| 2010/0228964 A1 | 9/2010 | Booth | |
| 2010/0275026 A1* | 10/2010 | McLean | G06F 21/12 713/176 |
| 2011/0173699 A1 | 7/2011 | Figlin et al. | |
| 2011/0302624 A1 | 12/2011 | Chen et al. | |
| 2011/0321172 A1 | 12/2011 | Maeda et al. | |
| 2012/0051314 A1 | 3/2012 | Goyal et al. | |
| 2012/0096510 A1 | 4/2012 | Bentall | |
| 2012/0173875 A1 | 7/2012 | Mahidhara et al. | |
| 2012/0311614 A1 | 12/2012 | DeAnna et al. | |
| 2013/0179061 A1 | 7/2013 | Gadh et al. | |
| 2013/0191905 A1 | 7/2013 | Harada et al. | |
| 2014/0036662 A1* | 2/2014 | Takeshima | H04L 49/505 370/229 |
| 2014/0051432 A1 | 2/2014 | Gupta et al. | |
| 2014/0237545 A1 | 8/2014 | Mylavarapu et al. | |
| 2014/0380484 A1 | 12/2014 | Choi et al. | |
| 2015/0134965 A1 | 5/2015 | Morenius et al. | |
| 2015/0172153 A1* | 6/2015 | Sharma | H04L 69/162 709/224 |
| 2015/0213237 A1 | 7/2015 | Kruglick | |
| 2016/0080399 A1 | 3/2016 | Harris et al. | |
| 2016/0191530 A1 | 6/2016 | Jain et al. | |
| 2016/0308904 A1 | 10/2016 | Yoon et al. | |
| 2016/0321452 A1* | 11/2016 | Richardson | G06F 21/50 |
| 2016/0364163 A1 | 12/2016 | Kamble | |
| 2016/0366108 A1 | 12/2016 | Kamble | |
| 2016/0366186 A1 | 12/2016 | Kamble | |
| 2016/0366187 A1 | 12/2016 | Kamble | |
| 2016/0373485 A1 | 12/2016 | Kamble | |
| 2016/0381076 A1 | 12/2016 | Kamble et al. | |
| 2017/0006065 A1 | 1/2017 | Kamble et al. | |
| 2017/0019388 A1 | 1/2017 | Kamble et al. | |
| 2017/0053120 A1 | 2/2017 | Kamble et al. | |
| 2017/0230414 A1 | 8/2017 | Kamble | |
| 2018/0069862 A1 | 3/2018 | Cholas et al. | |
| 2018/0089429 A1 | 3/2018 | Kamble | |

OTHER PUBLICATIONS

Notice of Allowance from U.S. Appl. No. 15/184,956, dated Sep. 4, 2018.

Non-Final Office Action from U.S. Appl. No. 15/424,749, dated Sep. 19, 2018.

Kar et al., "Prevention of SQL Injection Attack Using Query Transformation and Hashing," 3rd Annual IEEE International Advance Computing Conference, 2013, pp. 1317-1323.

Notice of Allowance from U.S. Appl. No. 15/181,275, dated Jul. 16, 2018.

Du, W., "SYN-Cookies Exploration Lab," Syracuse University, 2006, pp. 1-3.

Final Office Action from U.S. Appl. No. 15/191,420, dated Aug. 14, 2018.

Kamble, K., U.S. Appl. No. 15/181,275, filed Jun. 13, 2016.

Non-Final Office Action from U.S. Appl. No. 15/181,275, dated Dec. 8, 2017.

Younis, A., "Socket Data structures and How the TCP protocol works," CS457, Fall 2014, pp. 1-18 retrieved from http://www.cs.colostate.edu/-gersch/cs457/CS457 tutorial2.pdf.

Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.

Kamble, K., U.S. Appl. No. 15/181,304, filed Jun. 13, 2016.

Notice of Allowance from U.S. Appl. No. 15/181,304, dated Dec. 15, 2017.

Kamble, K., U.S. Appl. No. 15/182,505, filed Jun. 14, 2016.

Non-Final Office Action from U.S. Appl. No. 15/182,505, dated Apr. 6, 2018.

Kamble, K., U.S. Appl. No. 15/182,548, filed Jun. 14, 2016.

Non-Final Office Action from U.S. Appl. No. 15/182,548, dated Jun. 15, 2018.

Kamble, K., U.S. Appl. No. 15/184,956, filed Jun. 16, 2016.

Non-Final Office Action from U.S. Appl. No. 15/184,956, dated Mar. 30, 2018.

Kamble et al., U.S. Appl. No. 15/191,420, filed Jun. 23, 2016.

Non-Final Office Action from U.S. Appl. No. 15/191,420, dated Mar. 22, 2018.

Kamble et al., U.S. Appl. No. 15/197,635, filed Jun. 29, 2016.

Non-Final Office Action from U.S. Appl. No. 15/197,635, dated May 11, 2018.

Kamble et al., U.S. Appl. No. 15/210,828, filed Jul. 14, 2016.

Non-Final Office Action from U.S. Appl. No. 15/210,828, dated Jun. 13, 2018.

Kamble et al., U.S. Appl. No. 15/243,854, filed Aug. 22, 2016.

Kamble, K., U.S. Appl. No. 15/275,239, filed Sep. 23, 2016.

Non-Final Office Action from U.S. Appl. No. 15/275,239, dated May 16, 2018.

Kamble, K., U.S. Appl. No. 15/424,749, filed Feb. 3, 2017.

Non-Final Office Action from U.S. Appl. No. 15/243,854, dated Oct. 5, 2018.

Supplemental Notice of Allowance from U.S. Appl. No. 15/181,275, dated Oct. 17, 2018.

Corrected Notice of Allowance from U.S. Appl. No. 15/184,956, dated Oct. 29, 2018.

* cited by examiner

DATA SOCKET DESCRIPTOR ATTRIBUTES FOR APPLICATION DISCOVERY IN DATA CENTERS

FIELD OF THE INVENTION

The present invention relates to network and system protection, and more particularly, this invention relates to application discovery in data centers using data socket descriptor attributes.

BACKGROUND

Applications are made up of a large number of instructions and data. Instructions operate on data which is fetched in a cache and memory and is always unencrypted. Scaled-out, distributed applications are made up of a large number of application instances. These application instances have their own data in the cache and memory of the processor on which these applications run. A large number of such application instances communicate with each other and process data in parallel to create an aggregate output.

With thousands or even millions of applications and application instances running on a large number of servers, it is difficult to determine the health of an individual application or application instance and the security details of the individual application or application instance. Especially in virtualized data centers, applications are moved with the virtual machine (VM) or with a container. Tracking applications in such large data centers with virtualized workloads becomes yet another challenge. Moreover, security and behavior of the application become difficult tasks to maintain.

Scaled-out, distributed applications work as large numbers of application instances which may Dc be spread across a data center. Each instance of the application processes different data sets in parallel. Due to virtualization and allocation of resources dynamically across the data center, tracing each instance of the application is incredibly useful for management of the data center, if not necessary.

Also, these types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

SUMMARY

In one embodiment, a system includes a processing circuit and logic integrated with and/or executable by the processing circuit. The logic is configured to cause the processing circuit to collect all data socket descriptor databases from individual servers operating in a data center, each data socket descriptor database storing attributes of a base socket and one or more data socket descriptors used by an application or application instance operating on an individual server. The logic is also configured to cause the processing circuit to store data from the data socket descriptor databases for all applications and application instances operating in the data center in a central data socket descriptor database, the central data socket descriptor database being configured to store attributes of all data socket descriptors used by all applications or application instances operating in the data center.

According to another embodiment, a method includes collecting all data socket descriptor databases from individual servers operating in a data center, each data socket descriptor database storing attributes of a base socket and one or more data socket descriptors used by an application or application instance operating on an individual server. The method also includes storing data from the data socket descriptor databases for all applications and application instances operating in the data center in a central data socket descriptor database, the central data socket descriptor database being configured to store attributes of all data socket descriptors used by all applications or application instances operating in the data center.

In yet another embodiment, a computer program product includes a computer readable storage medium having program instructions stored thereon. The program instructions are executable by a processing circuit to cause the processing circuit to collect all data socket descriptor databases from individual servers operating in a data center, each data socket descriptor database storing attributes of a base socket and one or more data socket descriptors used by an application or application instance operating on an individual server. The program instructions are also executable to cause the processing circuit to store data from the data socket descriptor databases for all applications and application instances operating in the data center in a central data socket descriptor database, the central data socket descriptor database being configured to store attributes of all data socket descriptors used by all applications or application instances operating in the data center.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

DETAILED DESCRIPTION

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

Figure 1:
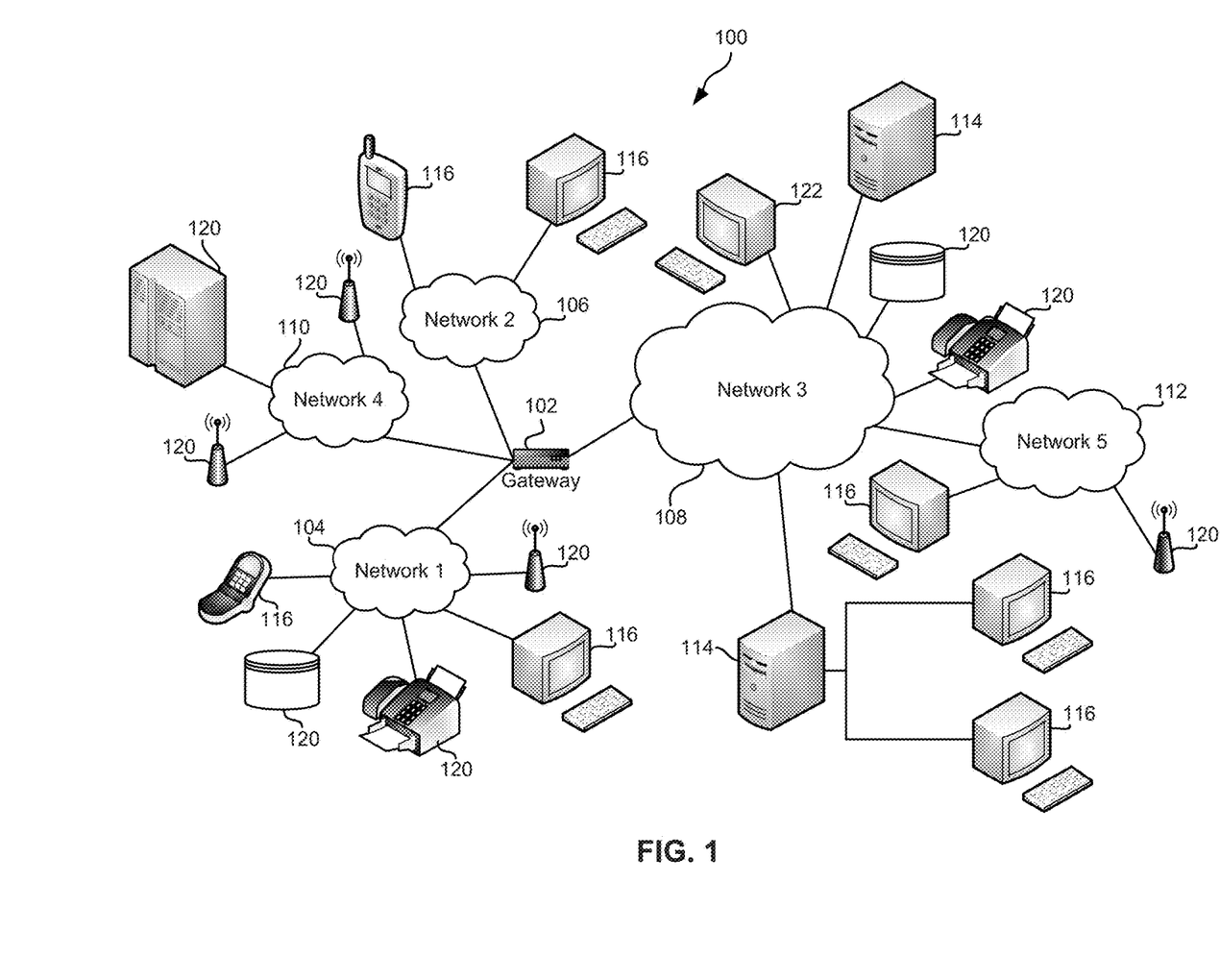
FIG. 1 shows a network architecture, according to one embodiment.

FIG. 1 illustrates an architecture 100, in accordance with one embodiment. As an option, the present architecture 100 may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one enbodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
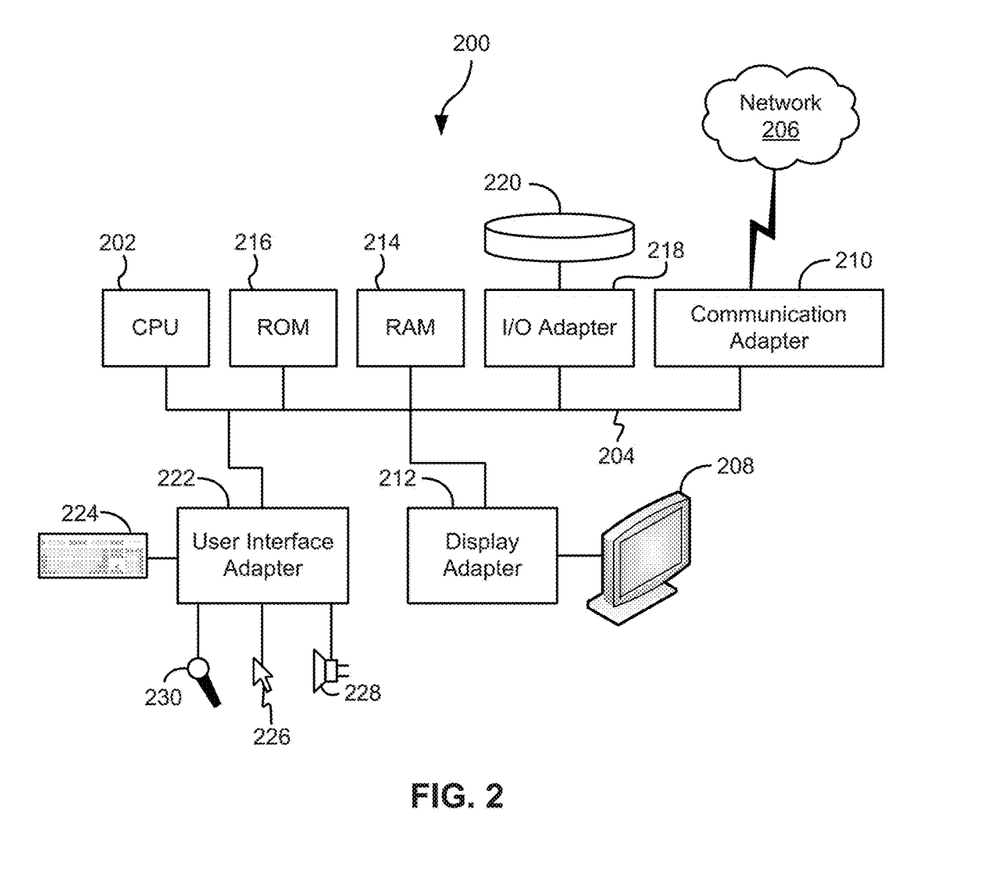
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
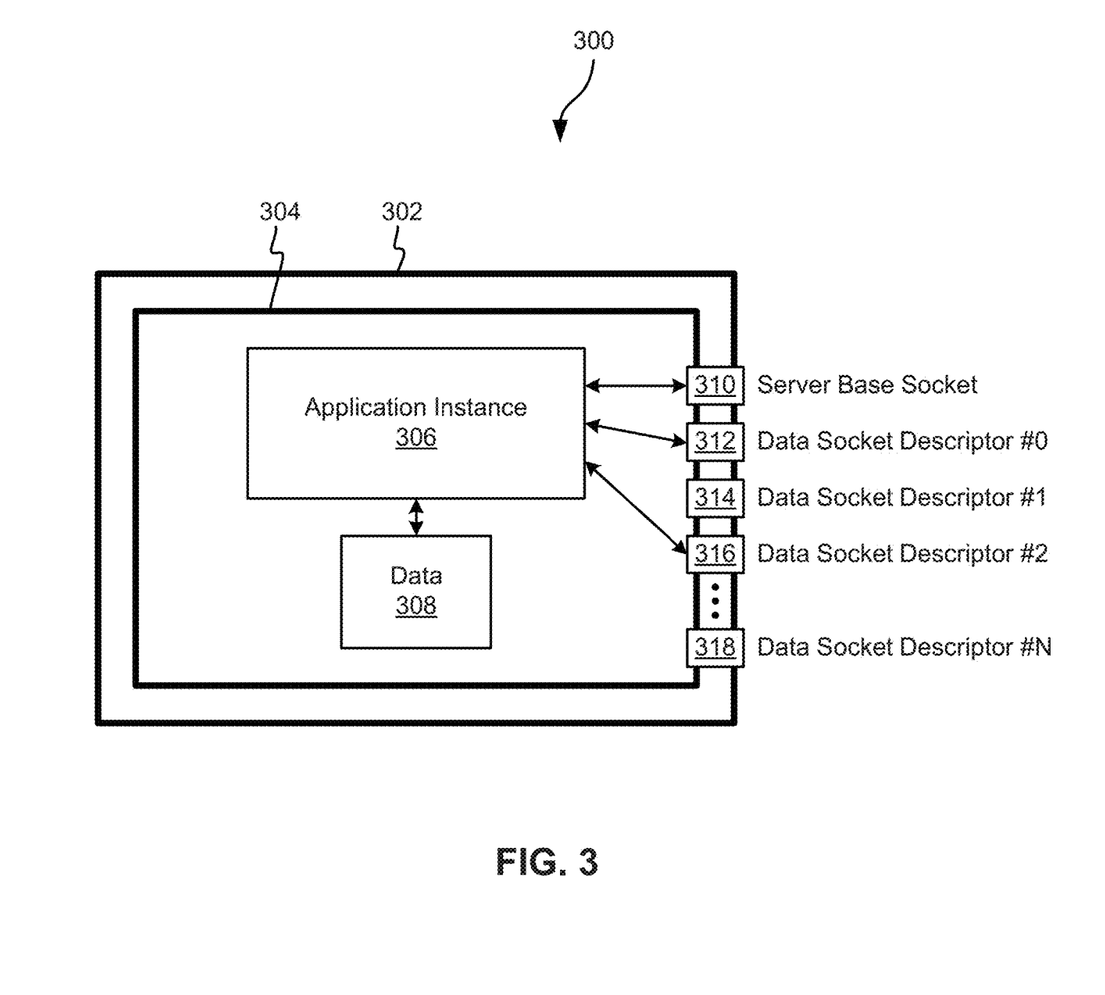
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom application programming interfaces (APIs), may utilize any of a plurality of data socket descriptors e.g., (e.g., data socket descriptor #0 312, data socket descriptor #1 314, data socket descriptor #2 316, . . . , data socket descriptor #N 318) with which to communicate (send and/or receive) formation information outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels, etc.

Using the above two operations, two layers of protection (application protection and data protection) are enacted together to protect the application (not shown) from which the application instance 306 is provided and any group of application instances related to the application that provides the application instance 306.

The APL 302 works with data socket APIs and data socket libraries to provide protection to application instances and to the data that is used by the application instances. While doing so, the APL 302 does not interfere with the application architecture and its normal behavior. Through these new APIs, each application instance receives extra capabilities to ensure that all flows entering and exiting the application instance are trusted flows. Moreover, the APL 302 receives additional infrastructural help by being informed about the security status of virtual and/or physical servers on which the application instance is running, along with the security status of other application instances and their virtual and/or physical servers. Based on the comprehensive status of the servers and network in the data center, the APIs provide feedback and suggest FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the APL 302 and the DPL 304 utilize individual sets of APIs that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system. The server base socket 310 has the following attributes and/or characteristics:

1. A server and/or a source internet protocol (IP) interface.
2. A standard and/or known server port number, e.g., transmission control protocol (TCP) port, user datagram protocol (UDP) port, etc.
3. A maximum number of allowable waiting connections.
4. A maximum (and possibly minimum) application packet buffer size usable for transmitting and receiving data.
5. Other socket options provided by the operating system, the user, or an external input.

The above described attributes and/or characteristics may also be attributed to the plurality of allocated data socket descriptors 312, 314, 316, . . . , 318. When a connection is established between the computing system 300 and another system via the application instance 306, a data socket descriptor is allocated. The allocated data socket descriptor has the following attributes and/or characteristics:

1. A server and/or a source IP interface.
2. A standard and/or known server port number, e.g., transmission control protocol (TCP) port, user datagram protocol (UDP) port, etc.

3. A maximum number of allowable waiting connections.
4. Application packet buffer size for transmit and receive.
5. A port number of the transport of the allocated data socket descriptor (in the computing system 300).
6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above described characteristics and/or attributes, additional characteristics that may be attributable to an allocated data socket descriptor include:

9. A first identifier (ID1): a globally unique identification number given for an entity (such as an enterprise, company, university, city subdivision, etc.) that utilizes the ADPL mechanism in the application instances or programmed for proprietary purposes.
10. A second ID (ID2): a unique identification number within the entity (not necessarily globally unique). Each ID2 represents a subdivision within the entity, such as an individual business unit within an enterprise, a water district within a city, etc., or programmed for proprietary purposes.
11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.
16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criterions where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group.

Figure 4:
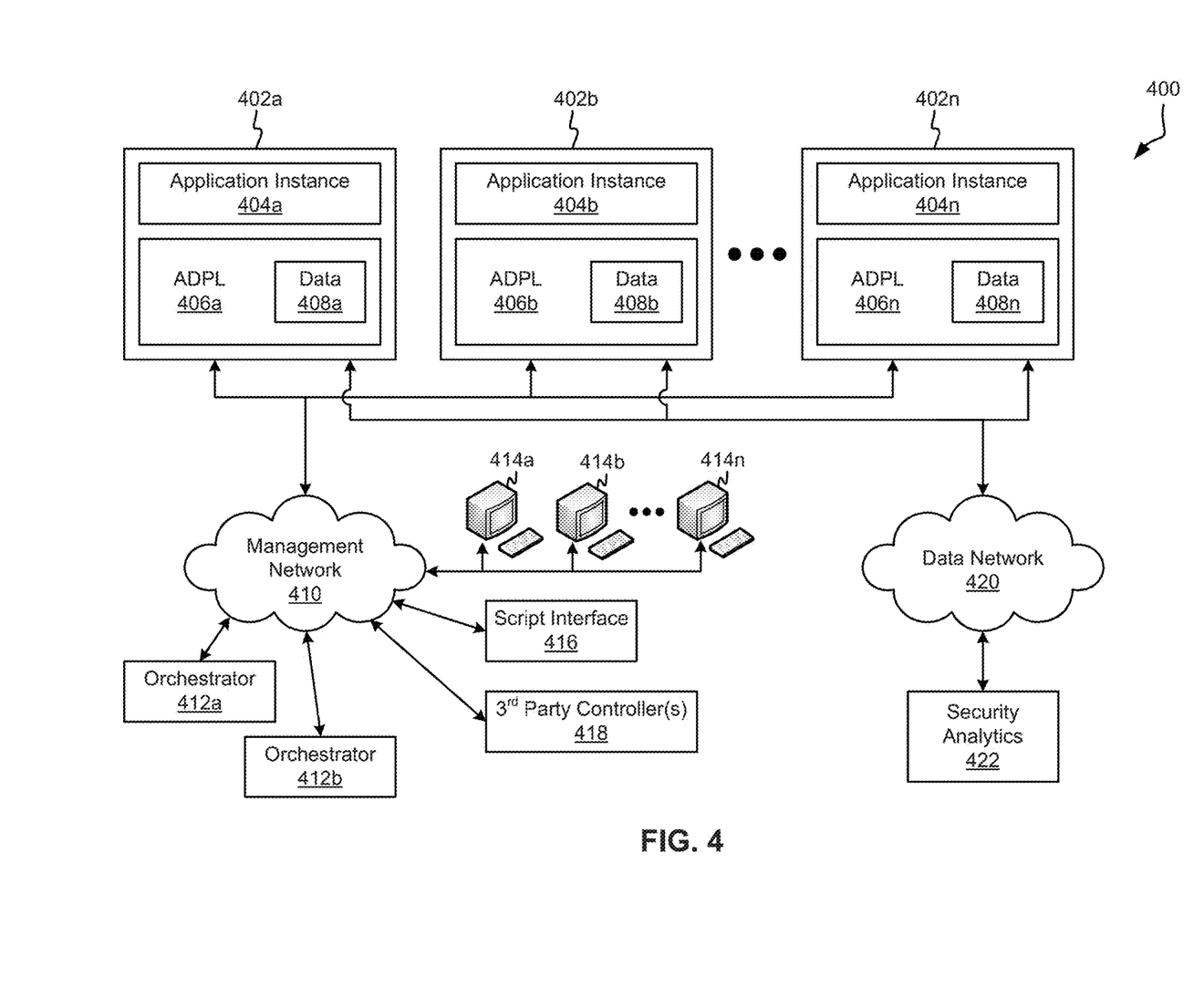
FIG. 4 shows an application and data protection library (ADPL) control model implemented in a data center, according to one embodiment.

FIG. 4 shows the ADPL control model implemented in a data center 400, according to one embodiment. As shown, one or more policy orchestrators 412a, 412b is associated with the management network 410. More than one policy orchestrator may be utilized in high availability (HA) mode. Each policy orchestrator 412a, 412b may include segment management, policies management, configuration management, application tracking, a security trending controller, and software defined control.

From the management network 410, APIs, such as representational state transfer (REST) APIs (among others known in the art), may be distributed to the plurality of management consoles 414a, 414b, . . . 414n, the scripted interface 416, and/or to one or more third party controllers 418. Each of the plurality of management consoles 414a, 414b, . . . , 414n may include a graphical interface, REST API-based programmability, trending, analysis, auditing, and third party controller integration.

One or more virtual platforms 402a, 402b, . . . , 402n host one or more ADPL-shielded application instances 404a, 404b, . . . , 404n along with data 408a, 408b, . . . , 408n utilized by each application instance 404a, 404b, . . . , 404n which are protected by ADPLs 406a, 406b, . . . , 406n.

The primary policy orchestrator 412a communicates to the one or more ADPL-shielded application instances 404a, 404b, . . . , 404n through the management network 410. Each of the ADPLs 406a, 406b, . . . , 406n operating for each individual application instance 404a, 404b, . . . , 404n may include application protection and policy enforcement, data protection and policy enforcement, and collection of statistics of normal and malicious behavior.

The data network 420 is associated with a security analytics module 422 which may include a security analytics engine and a collection of security analysis tools. In more approaches, the security analytics module 422 may include FireEye Sandbox, and/or other third party security analysis tools, from third parties such as IBM, CISCO, SYMANTEC, MCAFEE, etc. Moreover, the security analytics module 422 may provide feedback to the one or more policy orchestrators 412a, 412b.

One or more of the application instances 404a, 404b, . . . , 404n may be grouped together in pico-segments or groups that each include related application instances that share characteristics based on data socket descriptors, among other characteristics. The policy orchestrator 412a, 412b interacts with the various pico-segments of application instances in which ADPL-shielded application instances 404a, 404b, . . . , 404n are grouped together as a whole, rather than with each individual application instance individually.

Figure 5:
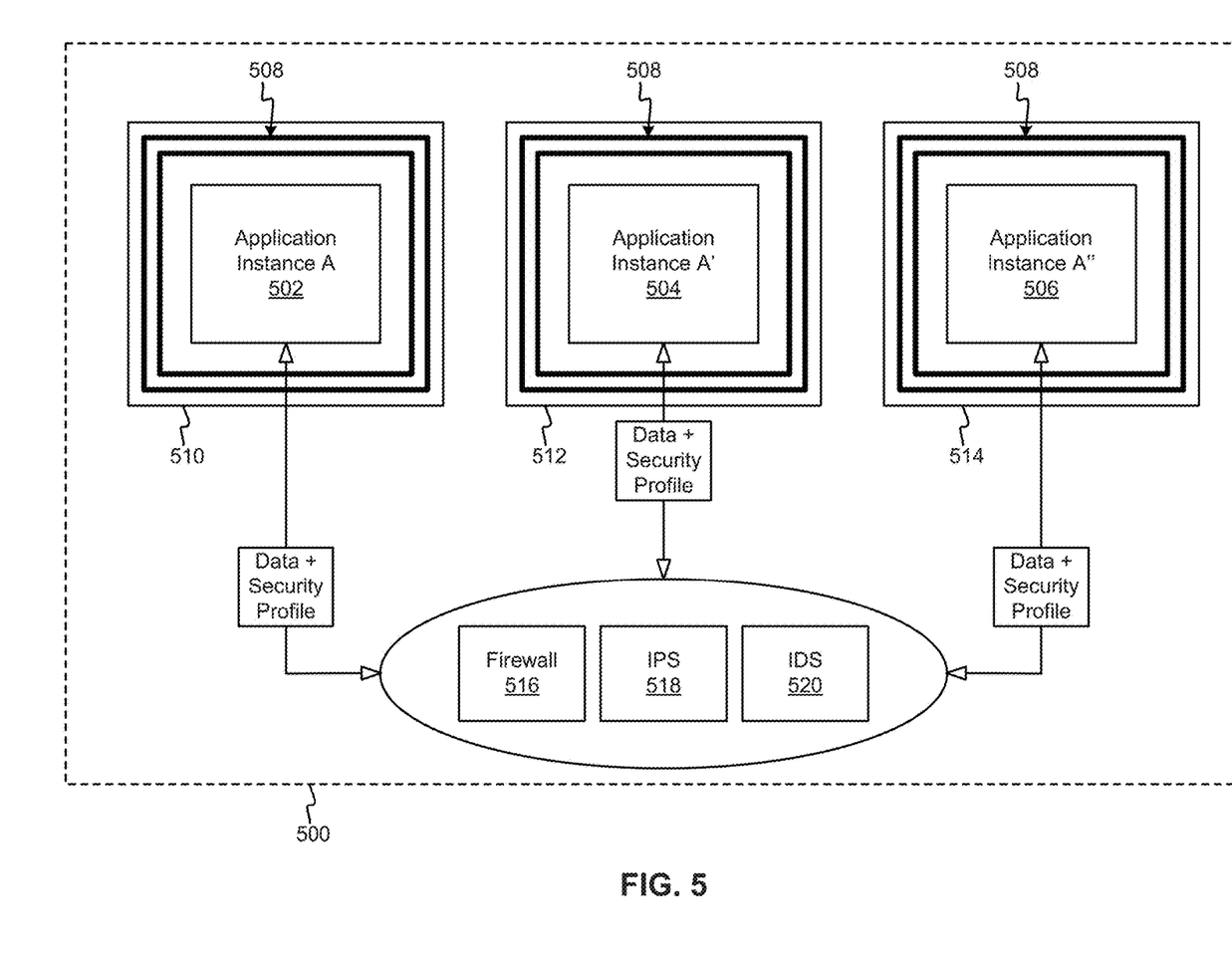
FIG. 5 shows several application instances operating in a virtual environment, according to one embodiment.

Now referring to FIG. 5, three instances of an application, Application instance A 502, Application instance A' 504, and Application instance A" 506 are shown running in a virtual environment 500 on one or more virtual platforms, such as hypervisors. Many more than three instances of an application may be running in the virtual environment 500 at any one time as would be understood by one of skill in the art, on the order of thousands or millions in some cases. An ADPL 508 provided by secure APIs called by the hosts, Host A 510, Host A' 512, and Host A" 514, enables application protection via policies and also provides data protection by sharing a security status and security profile with any peer application instances operating on other hosts (Application instance A 502 is a peer to Application instance A' 504, Application instance A' 504 is a peer to Application instance A" 506, Application instance A" 506 is a peer to Application instance A 502, and so forth). Using the security profile of the peer application instance, the protected application instance is provided the capability to apply various data security mechanisms to protect itself from malicious code and data breach attacks.

Each instance of the application (e.g., Application instance A 502, Application instance A' 504, Application instance A" 506, etc.) may run on the same physical machine or on different physical or virtual machines in the data center. However, all the application instances communicate with each other to share data and other information to satisfy queries.

New socket APIs and data protection APIs that are utilized to provide the protection do not disturb any intermediate security appliances used in the network and/or on the servers or hosts, such as a firewall 516, an Intrusion Prevention System (IPS) 518, an Intrusion Detection System (IDS) 520, etc.

The ADPL 508 around the socket descriptors for database applications creates a mapping of security profile policies with the application per data socket descriptor to perform various security feature functionality, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

Figure 6:
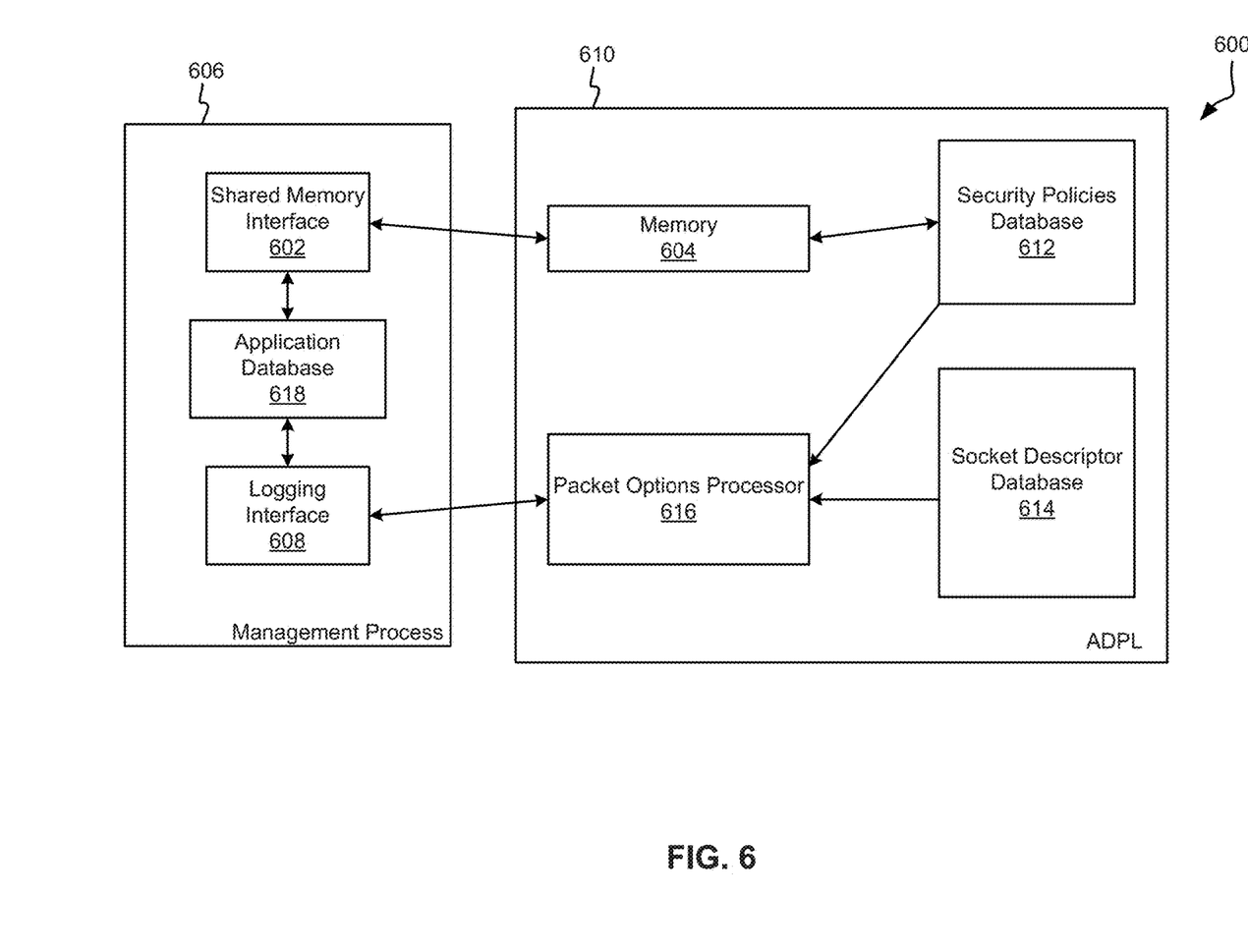
FIG. 6 shows the ADPL architecture according to one embodiment.

Now referring to FIG. 6, the ADPL architecture 600 is shown according to one embodiment. A shared memory interface 602 (also referred to as a message queue) is used by inter-process communications (IPC) for multiple process communications, including messaging, using a memory 604, which may be a shared memory in one embodiment. The shared memory interface 602 is used to send and receive configuration and messages between the management process 606 and ADPL libraries (target applications) 610. The size of the memory 604 is set to be of a size to ensure optimum messaging performance.

The logging interface 608 utilizes the management process 606 on one side and the ADPL 610 on the other side. The management process 606 is a message multiplexer in one embodiment. Moreover, the management process 606 may be an independent module, thread, and/or process created when the first application instance using the ADPL 610 is spawned. The application instance calls an ADPL socket API for communication with other entities. The ADPL API checks for the presence of the management process 606. In response to a determination that the process exists, the ADPL API registers itself with the management process 606 along with all its associated and/or requested attributes. During run time, the ADPL API registers each data socket descriptor opened for communication in the Socket Descriptor Database 614 kept with the application instance by the ADPL API. The Socket Descriptor Database 614 includes a list of all registered data sockets with associated data socket descriptors, DIP, base keys, and a latest key for transmission. Policy functions may be added, deleted, modified, and searched within the Socket Descriptor Database 614.

The management process 606 may be configured to perform and/or maintain the following functionality:

1. Track existing and new application instances on the server including their individual communication sessions at the base socket level and at the data socket descriptor level in both discovery-only mode and in protection mode.
2. Store a list of the latest and/or most active applications that utilize ADPL in protection mode, and applications that utilize ADPL in discovery-only mode.
3. Perform configuration management including forwarding configuration messages and other messages between the ADPL and the policy orchestrator.
4. Perform application health checks and monitor the health of registered applications that utilize ADPL in protection mode.

In addition, the Application Database 618 within the management process 606 is configured to have a list of registered applications stored therein based on data socket descriptor discovery.

The management process 606 is configured to utilize all the application registry data to provide the application tracking function. Every time a new application or data socket is registered, details/attributes of the new application and/or data socket are provided to the policy orchestrator that is configured to control the configuration and details of each individual application instance. The socket descriptor details provided by the management process 606 from individual servers help the policy orchestrator to group all the data socket descriptors and application instances together to form a larger picture of all the applications running across the data center, also referred to as application visualization.

The management process 606 is also configured to communicate with the policy orchestrator, which in turn provides policy related configuration to the management process 606 to be applied to individual data socket descriptors of the application instance. On the other hand, the management process 606 communicates with the application instance and provides the application instance with the configuration.

The management process 606 is also configured to check health of application instances via health check messages, among other mechanisms. This health check information in run-time may be used to keep track of the health of each individual application instance, especially the application process status. Using this information for application performance, distribution of workloads and trouble-shooting of the scaled out application is possible.

The Security Policies Database 612 includes hash-based keys for each policy. The Socket Descriptor Database 614 includes a list of all registered data sockets with associated data socket descriptors, DIP, base keys, and a latest key for transmission. The packet options processor 616 is configured to provide packet processing, and may include some or all of the following functionality: packet receive processing, reading data socket options, keys processing per security policies, security profile processing per security policies, finding violations and updating keys, and updating logs.

Figure 7:
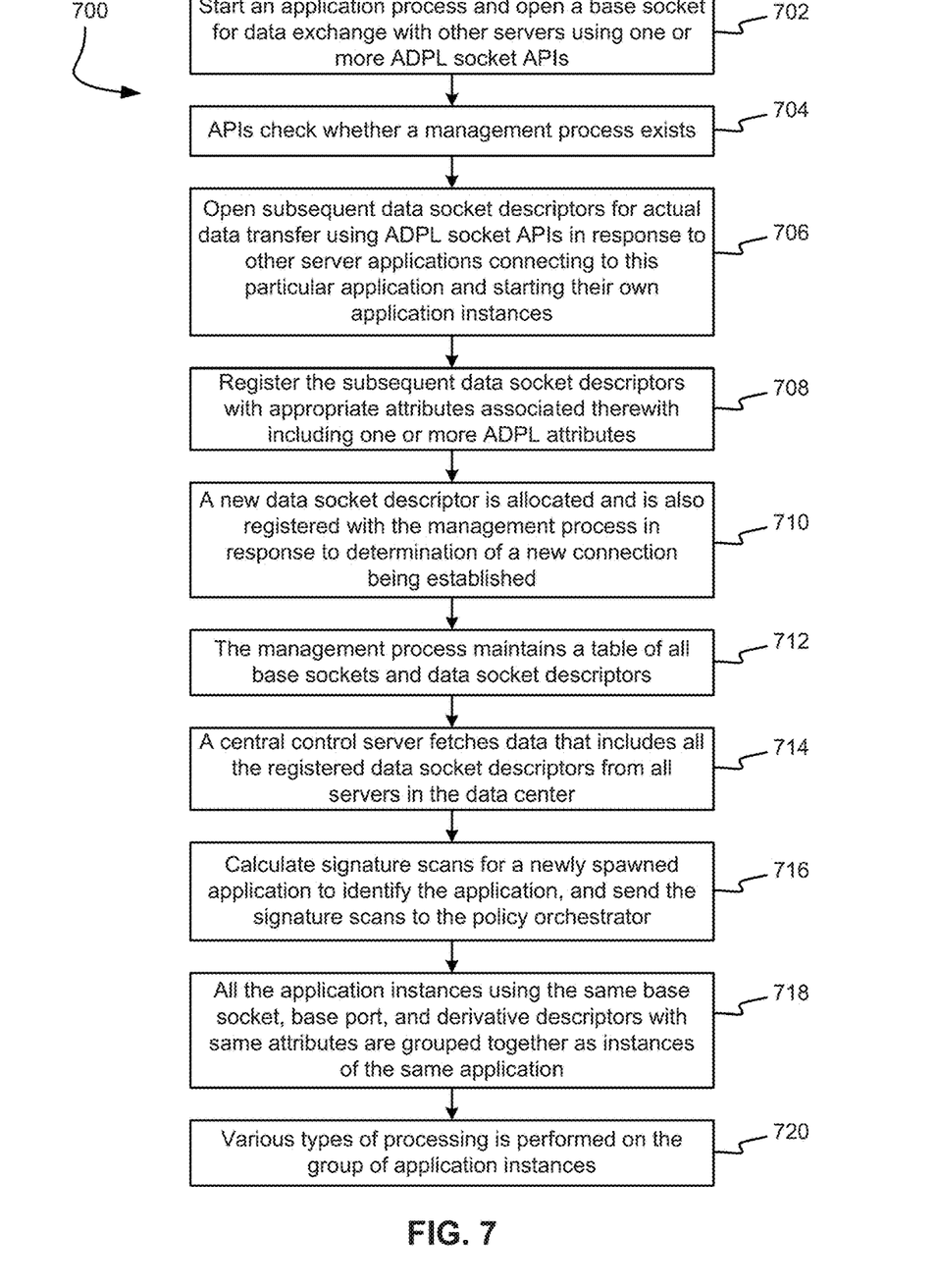
FIG. 7 shows a flowchart of a method, according to one embodiment.

Now referring to FIG. 7, a flowchart of a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be apparent to one of skill in the art upon reading the present descriptions.

Each of the steps of the method 700 may be performed by any suitable component of the operating environment. For example, in various embodiments, the method 700 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 700. Illustrative processing units include, but are not limited to, a central processing unit (CPU), an ASIC, a FPGA, etc., combinations thereof, or any other suitable computing device known in the art.

As shown in FIG. 7, method 700 may initiate with operation 702, where an application process comes up and opens a base socket for data exchange with other servers using one or more ADPL socket APIs.

In operation 704, APIs check whether a management process exists. In response to the management process being found, the API registers the base socket and its attributes with the management process. In a further embodiment, application names along with one or more other parameters are also registered with the management process.

In operation 706, subsequent data socket descriptors for actual data transfer are opened using ADPL socket APIs in response to other server applications connecting to this particular application and starting their own application instances.

In operation 708, the subsequent data socket descriptors are registered with appropriate attributes associated therewith including one or more ADPL attributes.

In operation 710, in response to determination of a new connection being established, a new data socket descriptor is allocated and is also registered with the management process. Whenever a connection is terminated, an associated data socket descriptor is deleted and de-registered with the management process.

In operation 712, the management process maintains a table of all base sockets and data socket descriptors. All the base sockets and data socket descriptors which use the same base server port, ID1, ID2, application name, derivative descriptor of the same base socket, and/or the same server port are all grouped together in a server group (picosegment). The application discovery mechanism also provides details of pico-segment memberships based on the attributes of sessions of each application.

In operation 714, a central control server (such as a policy orchestrator or some other suitable device in the data center) fetches data that includes all the registered data socket descriptors from all servers in the data center.

In operation 716, one or both of the management process and the ADPL calculate one or more signature scans for a newly spawned application. This this calculation may be based on known methods, such as md5sum, SHA-1, SHA-256, or some other method to uniquely identify applications. The one or more signature scan, along with application name, physical path in storage, server application is operating on (and possibly more data) is sent to the policy orchestrator. This data is sent to the policy orchestrator in addition to all data socket, data socket descriptor, and data socket descriptor attribute information.

In operation 718, all the application instances using the same base socket, base port, and derivative descriptors with same attributes (base attributes+ADPL attributes) are grouped together as instances of the same application. These application instances may be processing different data sets, but are part of the same group.

In operation 720, various types of processing is performed on the group of application instances, including, but not limited to, applying similar security policies, tracking of application workloads, process priorities, process states, etc.

Method 700 may be implemented as a system, process, or a computer program product. As a system, method 700 may be implemented on the first host and/or the second host as logic configured to perform method 700, along with being implemented on any other hosts on which secure communications are desired. As a computer program product, a computer readable storage medium may store program instructions configured to perform method 700.

For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 700, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 700 in one embodiment.

Figure 8:
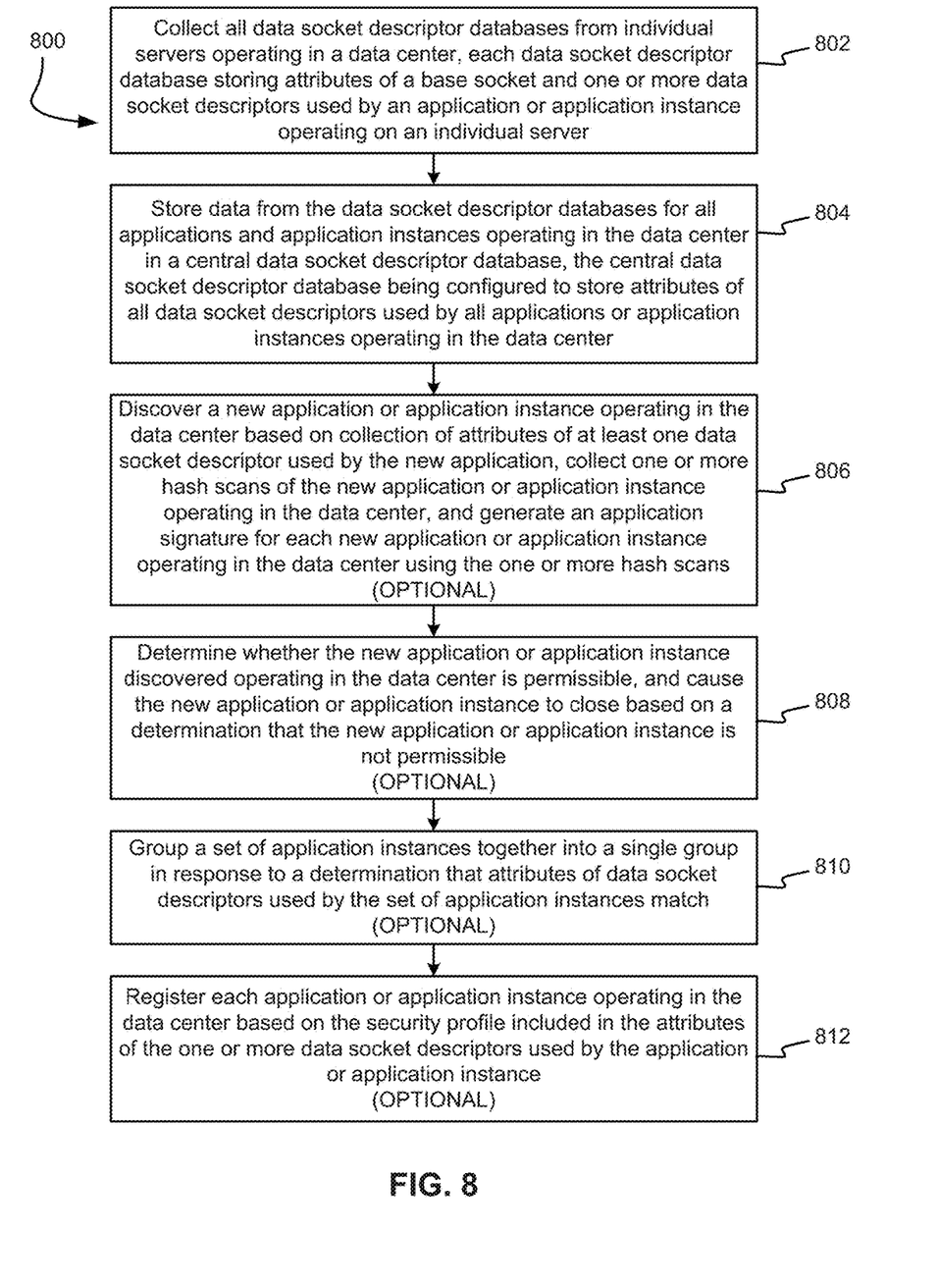
FIG. 8 shows a flowchart of a method, according to one embodiment.

Now referring to FIG. 8, a flowchart of a method 800 is shown according to one embodiment. The method 800 may be performed in accordance with the present invention in any of the environments depicted in FIGS. 1-6, among others, in various embodiments. Of course, more or less operations than those specifically described in FIG. 8 may be included in method 800, as would be apparent to one of skill in the art upon reading the present descriptions.

Each of the steps of the method 800 may be performed by any suitable component of the operating environment. For example, in various embodiments, the method 800 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 800. Illustrative processing units include, but are not limited to, a CPU, an ASIC, a FPGA, etc., combinations thereof, or any other suitable computing device known in the art.

As shown in FIG. 8, method 800 may initiate with operation 802, where all data socket descriptor databases are collected (such as by a policy orchestrator or some other central controller of a data center) from individual servers operating in the data center. Each data socket descriptor database stores attributes of a base socket and one or more data socket descriptors used by an application or application instance operating on individual servers in the data center.

In operation 804, data from the data socket descriptor databases for all applications and application instances operating in the data center is stored in a central data socket descriptor database. The central data socket descriptor database is configured to store attributes of all data socket descriptors used by all applications or application instances operating in the data center.

In optional operation 806, a new application or application instance operating in the data center is discovered based on the collection of attributes of at least one data socket descriptor used by the new application (and possibly an application signature and/or hash scan). In operation 802, attributes of data socket descriptors used by all the applications or application instances are collected, and from this information, it may be determined when a new application or application instance begins operating in the data center, because it will utilize one or more data socket descriptors that have attributes unique from those already collected.

Moreover, in optional operation 806, one or more hash scans of the new application or application instance operating in the data center are collected. These hash scans may be generated using any known methods, such as md5sum, SHA-1, SHA-256, etc., among other methods possible of generating a unique signature scan of an application or application instance.

Additionally, in optional operation 806, an application signature is generated for each new application or application instance operating in the data center using the one or more hash scans. The application signature may include any relevant attributes of the new application or application instance, such as application name, server name of the server on which the new application or application instance is operating, IP address of the server, path of the new application or application instance, etc.

In optional operation 808, it is determined whether the new application or application instance discovered operating in the data center is permissible. This determination of permissible and impermissible applications may be based on a decision of whether the new application or application instance does not belong to any group and/or is not registered in the central data socket descriptor database. This determination may also be based on the new application or application instance not being stored in a central whitelist of applications allowed to operate in the data center, as based on one or more signature scans of the application or application instance.

A central whitelist is a computer administration practice used to prevent unauthorized programs or applications from running within the data center. The purpose of the whitelist is primarily to collect information about authorized applications and application instances to protect resources in the data center (such as servers, computers, and networks) from harmful and/or malicious applications, and, to a lesser extent, to prevent unnecessary demand for resources within the data center. The whitelist is simply a list of applications that have been authorized, to operate within the data center by a user or administrator of the data center.

Furthermore, the new application or application instance is caused to close based on a determination that the new application or application instance is not permissible. When method 800 is performed by the policy orchestrator, a message may be sent to the individual server on which the new application or application instance is operating to close the new application or application instance. In another embodiment, when a server is executing method 800, it may simply close the new application or application instance.

In optional operation 810, a set of application instances may be grouped together into a single group (pico-segment) in response to a determination that attributes of data socket descriptors used by the set of application instances match. The attributes may include any or all of the following: base socket attributes such as server and/or a source IP interface, a standard and/or known server port number, a maximum number of allowable waiting connections, application packet buffer size for transmit and receive, a port number of the transport of the allocated data socket descriptor, an IP address of the peer data socket descriptor of the allocated data socket descriptor, a port number of the transport of the peer data socket descriptor of the allocated data socket descriptor in all cases of controlled port allocations by the application or application instance, a maximum (and possibly minimum) application packet buffer size usable for transmitting data to and receiving data from (transmissions with) the peer data socket descriptor; and data socket descriptor attributes such as ID1, ID2, a secure base signature, a secure runtime signature, an application name, an application ID, a process ID, a server port, and a transport protocol.

In one embodiment, the attributes of data socket descriptors may include a security profile for an individual server on which the application or application instance operates.

In optional operation 812, each application or application instance operating in the data center is registered based on the security profile included in the attributes of the one or more data socket descriptors used by the application or application instance. When the security profile indicates a risk above a threshold value (or any risk at all in some embodiments), the application or application instance is not registered in the central data socket descriptor database.

Method 800 may be implemented as a system, process, or a computer program product. As a system, some or all of method 800 may be implemented on a server and/or a policy orchestrator as logic configured to perform method 800, along with being fully or partially implemented on any other servers or hosts on which secure communications are desired. As a computer program product, a computer readable storage medium may store program instructions configured to perform method 800.

For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to perform method 800, in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 800 in one embodiment.

In one embodiment, applications and application instances may be registered and grouped together into pico-segments based on base socket and data socket descriptor attributes.

In another embodiment, organizational attributes may be allocated to data socket descriptors and/or session flows, and all such data socket descriptors may be registered via application socket APIs on individual servers (physical or virtual) in the data center.

In one embodiment, a policy orchestrator or some other central controller of the data center may collect all the registered data socket descriptor databases from individual servers or virtual servers in the data center and create a central data socket descriptor database which provides a picture of all distributed applications and their instances in the data center.

This allows the policy orchestrator or central controller to understand application presence and health (via a query mechanism and examining data socket descriptor attributes of an application or instance). Both standard attributes provided by the OS and ADPL-specific attributes may be used. Health may be determined based upon the piggybacked messages dealing with configuration and statistical collection messages sent to and received from an application or instance.

In another embodiment, dynamic work load allocation may be performed based on auto-discovery of application instances, application health, threat levels to application instances, application process priority, thread count, memory allocation, and other programmable application attributes. The optimum allocation of workloads across all application instances of a particular application is possible due to the collection of data socket descriptor attributes.

In accordance with another embodiment, dynamic detection of an application instance being locked or in a suspended state is possible based on the collection of data socket descriptor attributes and health checks on applications and application instances. A local management process may lock or suspend an application or application instance for many different reasons.

Variations of the systems, methods, and computer program products described herein are also possible, and the explicit description thereof in this document is not required in order to provide those of skill in the art with the ability to conceive of such variations when reading the present descriptions.

What is claimed is:

1. A system, comprising:
a processing circuit and logic integrated with and/or executable by the processing circuit, the logic being configured to cause the processing circuit to:
collect all data socket descriptor databases from individual servers operating in a data center, each data socket descriptor database storing attributes of a base socket and one or more data socket descriptors used by an application or application instance operating on an individual server;
store data from the data socket descriptor databases for all applications and application instances operating in the data center in a central data socket descriptor database, the central data socket descriptor database being configured to store attributes of all data socket descriptors used by all applications or application instances operating in the data center; and
discover a new application or application instance operating in the data center based on: collection of attributes of at least one data socket descriptor used by the new application or application instance operating in the data center; and comparison of the attributes of all data socket descriptors used by all applications or application instances operating in the data center stored in the central data socket descriptor database with the attributes of the at least one data socket descriptor used by the new application or application instance operating in the data center; and
collecting one or more hash scans of the new application or application instance operating in the data center; generating an application signature for each new application or application instance operating in the data center using the one or more hash scans; wherein the attributes of the one or more data socket descriptors each respectively comprise a security profile indicating a risk associated with the application or application instance running on a particular server operating in the data center, and the system further comprising: mapping one or more security profile policies to one or more corresponding data socket descriptors;
determining whether the new application or application instance discovered operating in the data center is permissible; and causing the new application or application instance to close based on a determination that the new application or application instance is not permissible.

2. The system as recited in claim 1, wherein the determination that the new application or application instance is not permissible is based on at least one decision selected from a group comprising: the new application or application instance does not belong to any group, the new application or application instance is not registered in the central data socket descriptor database, and the new application or application instance is not stored in a central whitelist of applications allowed to operate in the data center based on the one or more hash scans of the new application or application instance operating in the data center.

3. The system as recited in claim 1, wherein the logic further causes the processing circuit to:
group a set of application instances together into a single group in response to a determination that attributes of data socket descriptors used by the set of application instances match.

4. The system as recited in claim 1, wherein the attributes of data socket descriptors include a security profile for an individual server on which the application or application instance operates, and wherein the logic further causes the processing circuit to not register the new application or application instance in the central data socket descriptor database in response to the security profile indicating a risk above a threshold value.

5. The system as recited in claim 4, wherein the logic further causes the processing circuit to:
register each application or application instance operating in the data center based on the security profile included in the attributes of the one or more data socket descriptors used by the application or application instance.

6. A method, comprising:
collecting all data socket descriptor databases from individual servers operating in a data center, each data socket descriptor database storing attributes of a base socket and one or more data socket descriptors used by an application or application instance operating on an individual server;
storing data from the data socket descriptor databases for all applications and application instances operating in the data center in a central data socket descriptor database, the central data socket descriptor database being configured to store attributes of all data socket descriptors used by all applications or application instances operating in the data center;
discovering a new application or application instance operating in the data center based on: collection of attributes of at least one data socket descriptor used by the new application or application instance operating in the data center; and comparison of the attributes of all data socket descriptors used by all applications or application instances operating in the data center stored in the central data socket descriptor database with the attributes of the at least one data socket descriptor used by the new application or application instance operating in the data center; and
collecting one or more hash scans of the new application or application instance operating in the data center; generating an application signature for each new application or application instance operating in the data center using the one or more hash scans;

wherein the attributes of the one or more data socket descriptors each respectively comprise a security profile indicating a risk associated with the application or application instance running on a particular server operating in the data center, and the method further comprising: mapping one or more security profile policies to one or more corresponding data socket descriptors;

determining whether the new application or application instance discovered operating in the data center is permissible; and causing the new application or application instance to close based on a determination that the new application or application instance is not permissible.

7. The method as recited in claim 6, wherein the determination that the new application or application instance is not permissible is based on at least one decision selected from a group comprising: the new application or application instance does not belong to any group, the new application or application instance is not registered in the central data socket descriptor database, and the new application or application instance is not stored in a central whitelist of applications allowed to operate in the data center based on the one or more hash scans of the new application or application instance operating in the data center.

8. The method as recited in claim 6, further comprising: grouping a set of application instances together into a single group in response to a determination that attributes of data socket descriptors used by the set of application instances match.

9. The method as recited in claim 6, wherein the attributes of data socket descriptors include a security profile for an individual server on which the application or application instance operates, and wherein the security profile comprises an indication of a risk of running the application or application instance on the individual server.

10. The method as recited in claim 9, wherein the attributes of data socket descriptors include a security profile for an individual server on which the application or application instance operates, and the method further comprising:

registering each application or application instance operating in the data center based on the security profile included in the attributes of the one or more data socket descriptors used by the application or application instance.

11. A computer program product, comprising a non-transitory computer readable storage medium having program instructions stored thereon, the program instructions being executable by a processing circuit to cause the processing circuit to:

collect all data socket descriptor databases from individual servers operating in a data center, each data socket descriptor database storing attributes of a base socket and one or more data socket descriptors used by an application or application instance operating on an individual server;

store data from the data socket descriptor databases for all applications and application instances operating in the data center in a central data socket descriptor database, the central data socket descriptor database being configured to store attributes of all data socket descriptors used by all applications or application instances operating in the data center;

discovering a new application or application instance operating in the data center based on: collection of attributes of at least one data socket descriptor used by the new application or application instance operating in the data center; and comparison of the attributes of all data socket descriptors used by all applications or application instances operating in the data center stored in the central data socket descriptor database with the attributes of the at least one data socket descriptor used by the new application or application instance operating in the data center; and collecting one or more hash scans of the new application or application instance operating in the data center; generating an application signature for each new application or application instance operating in the data center using the one or more hash scans; wherein the attributes of the one or more data socket descriptors each respectively comprise a security profile indicating a risk associated with the application or application instance running on a particular server operating in the data center, and the program instructions further comprising: mapping one or more security profile policies to one or more corresponding data socket descriptors;

determining whether the new application or application instance discovered operating in the data center is permissible; and causing the new application or application instance to close based on a determination that the new application or application instance is not permissible.

12. The computer program product as recited in claim 11, wherein the determination that the new application or application instance is not permissible is based on at least one decision selected from a group comprising: the new application or application instance does not belong to any group, the new application or application instance is not registered in the central data socket descriptor database, and the new application or application instance is not stored in a central whitelist of applications allowed to operate in the data center based on the one or more hash scans of the new application or application instance operating in the data center.

13. The computer program product as recited in claim 11, wherein the program instructions further cause the processing circuit to:

group a set of application instances together into a single group in response to a determination that attributes of data socket descriptors used by the set of application instances match.

14. The computer program product as recited in claim 11, wherein the attributes of data socket descriptors include a security profile for an individual server on which the application or application instance operates, and wherein the program instructions further cause the processing circuit to:

register each application or application instance operating in the data center based on the security profile included in the attributes of the one or more data socket descriptors used by the application or application instance, based on data socket descriptors collected for the application or application instance.

* * * * *